United States Patent [19]
Brewster et al.

[11] Patent Number: 6,070,133
[45] Date of Patent: *May 30, 2000

[54] INFORMATION RETRIEVAL SYSTEM UTILIZING WAVELET TRANSFORM

[75] Inventors: Mary E. Brewster; Nancy E. Miller, both of Kennewick, Wash.

[73] Assignee: Battelle Memorial Institute, Richland, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/897,957

[22] Filed: Jul. 21, 1997

[51] Int. Cl.⁷ .................................................. G06F 17/30
[52] U.S. Cl. .................................................................. 704/9
[58] Field of Search ................................ 704/1, 9; 707/6; 348/390; 382/248, 240, 232

[56] References Cited

U.S. PATENT DOCUMENTS

| | | | |
|---|---|---|---|
| 5,604,824 | 2/1997 | Chui et al. | 382/248 |
| 5,748,796 | 5/1998 | Zandi et al. | 382/240 |
| 5,841,473 | 11/1998 | Chui et al. | 348/390 |
| 5,987,459 | 11/1999 | Swanson et al. | 707/6 |

*Primary Examiner*—Vivian Chang
*Assistant Examiner*—Patrick N. Edouard
*Attorney, Agent, or Firm*—Douglas E. McKinley, Jr.

[57] ABSTRACT

A method for automatically partitioning an unstructured electronically formatted natural language document into its sub-topic structure. Specifically, the document is converted to an electronic signal and a wavelet transform is then performed on the signal. The resultant signal may then be used to graphically display and interact with the sub-topic structure of the document.

9 Claims, 4 Drawing Sheets subdocument chunking subdocument chunking subdocument chunking subdocument chunking

INFORMATION RETRIEVAL SYSTEM UTILIZING WAVELET TRANSFORM

This invention was made with Government support under Contract DE-AC06-76RL0 1830 awarded by the U.S. Department of Energy. The Government has certain rights in the invention.

FIELD OF THE INVENTION

The present invention relates generally to a method for automatically partitioning an unstructured electronically formatted natural language document into its sub-topic structure and specifies a device that may be used to graphically display and interact with the sub-topic structure of the document.

BACKGROUND OF THE INVENTION

Many visualization systems have been built to help the information analyst sift though massive quantities of expository language text found in an electronic format in computer databases and the like. These types of systems have been critically important to identify key documents for intensive analysis. However, ultimately relevant documents are identified that require the time consuming effort of reading.

Efforts to speed this process has led to research in the area of Information Retrieval (IR), which has set a precedent for certain approaches as has research in applied Mathematics and Statistics. An example of this work is in automatic text theme identification with the end being to provide automated textual summaries of documents. ["Automatic Text Theme Generation and the Analysis of Text Structure", Salton, G and Amit Singhal, July 1994, TR 94-1438, Cornel Univ, Dept of Computer Science.] The mathematical basis for this approach is the standard Vector Space Model (VSM) used in IR. In the VSM each document is represented as a vector of weights with each weight corresponding to a particular word or concept in the text. Each paragraph is represented as a vector based on the words contained in the whole document. Similarities between paragraphs are calculated using a cosine measurement (normalized dot product) and are used to create a text relationship map. In the text relationship map, nodes are the paragraphs and links are the paragraph similarities. All groups of three mutually related (based on the similarity measure) paragraphs are identified and merged. These groups are then shown as triangles on the map. For each triangle, a centroid vector is created. A theme similarity parameter may then be used to merge triangles. The merging stops when further merges would fall outside the parameter range specified. The resulting merged triangles may then be associated with themes. A "tour" or summary of a document may be produced by ordering the merged triangles in chronological order and producing a summary for each of the merged triangle sets.

Another example used in IR is an algorithm for finding sub-topic structure in expository text that uses a moving window approach. [Multi-Paragraph Segmentation Of Expository Text, Marti A. Hearst, ACL '94, Las Cruces, NM]. Rather than using existing sentences and paragraphs, the words from the text are divided into token-sequences and blocks, each having a preselected length. For example, 20 words may be assigned as a token-sequence, which may then be described as a pseudo-sentence, and 6 token sequences may then be assigned as a block, which may then be described as a pseudo paragraph. Adjacent blocks are compared using cosine similarity measure on the full set of words within each block. Two adjacent blocks form a window. By shifting each window over by one token sequence, a comparison may be made for the next pair of adjacent windows. The cosine calculation for each window is centered over the gap between the blocks. Boundaries for topic changes are found by identifying the points of greatest change in the smoothed cosine-gap sequence from the moving windows after applying a set of rules. A typical set of rules might include having at least three intervening token sequences between boundaries and specifying that all boundaries must be moved to the end of the nearest paragraph.

In the VSM, certain "filters" are often used to identify the best words to characterize a document. Examples include filters which throw out words that occur too frequently or not frequently enough to allow documents within a corpus, or pieces within a document, to be successfully contrasted to one another. Certain articles of speech, conjunctions, certain adverbs (collectively called stop words) are thought to be devoid of theme content and are usually omitted from the document in VSM-based analysis. [Faloutsos, Christos, and Douglas Oard, "A survey of Information Retrieval and Filtering Methods"] Another useful and much more sophisticated filter is described by Bookstein whereby words which occur non-randomly in block of expository text are identified and selected as key topic words for thematic evolution, [Bookstein, A., S. T. Klein, and T. Raita (1995) Proceeding of the 15th Annual International ACM SIGIR Conference on Research and Development in Information Retrieval 319:327].

Various methods in IR have been also been used to compress vocabulary by looking at how words are associated with one another. In one approach, for example, a conditional probability matrix may be built such that each (i,j) entry represents the probability that word I occurs in a document (or corpus) given that word j also occurs. [Charniak, Eugene, "Statistical Language Learning", 1993, MIT Press]

Very generally in the VSM, the n-dimensional vector used to characterize the vocabulary for a particular document can be viewed as a signal, although the order of the terms in the vector is not related to chronological or narrative order. Both Hearst and Salton have created mathematical signals to represent a particular text as noted above. Hearst creates a smoothed token gap sequence that corresponds to the narrative order of the text. Merged paragraphs may also form a narrative based signal.

While all of these methods have advantages for IR, there still exists a need for an improved method of automatically partitioning an unstructured electronically formatted natural language document into its sub-topic structure.

SUMMARY OF THE INVENTION

The present invention utilizes spectral analysis of a waveform or digital signal created from written words contained in an electronically formatted natural language document as a method for providing document characterization. As will be apparent to those skilled in the art, a variety of methods for generating the digital signal may be utilized, provided the resultant digital signal is a numerical representation of the words within the document which numerical representation contains some information relating the semantic content of the words to the semantic content of the document. As practiced by the present invention, the digital signal retains the order of the words within the document. As used herein, the semantic content of the document refers to the theme, or topic of discourse of the discussion within the document narration. Semantic structure is the order in which the topics are discussed in the document narrative. As will be further apparent to those skilled in the art, different methods of producing the signal will provide varying levels of noise in the resultant signal. However, regardless of the signal to noise ratio produced by the particular method selected, the spectral analysis as performed according to the present method will amplify the signal and reduce the noise to allow the user to produce a visual representation of the semantic structure of the document.

OBJECTS

Accordingly, it is an object of the present invention to provide a method for automatically determining the semantic structure of an electronically formatted natural language based document. As contemplated by the present invention, an electronically formatted natural language based document consisting essentially of words is first provided wherein a numerical representation of the words within the document is provided as a digital signal wherein the numerical representation contains some information relating the semantic content of the word to the semantic content of the document. It is then a further object of the present invention to utilize spectral analysis of the digital signal as a method of characterizing the document. Accordingly, it is a further object of the present invention to provide this spectral analysis by performing a wavelet transform on the signal. The wavelet transform may be a fast wavelet transform, a redundant wavelet transform, a non-orthogonal wavelet transform, a local cosine transform, or a local sine transform. The output of the wavelet transform may then be utilized to generate a visual representation of the semantic structure of the document. For example, the visual representation of the semantic structure of the document may be a text based representation, a graphical representation or a combination of the two. It is a further object of the present invention to utilize the output of the wavelet transform to partition the document. The partition maybe according to the semantic content of the document at a single level, or at multiple levels to produce an outline of the document. Finally, it is an object of the present invention to partition the document according to the semantic content of the document at multiple levels to produce a fuzzy outline of the document. In this manner, the present invention allows the user to quickly identify changes in the theme in the document narration, define meaningful subdocuments, enhance queries of the document, and provide visual summaries of the topic evolution within the document without necessarily reading the document.

The numerical representation of the words within the document may be derived from a variety of methods including word frequency counts within the entire document, word frequency counts within subsets of the words in the document, functions of word frequency counts within the entire document, functions of word frequency counts within subsets of the words in the document, statistical correlations between words in the document, statistical correlations between groups of words contained in the document, or combinations of two or more of these methods. Regardless of the method selected, for the practice of the present invention the digital signal retain the word order found in the narrative.

To appreciate the operation of the present invention, it is useful to review some of the mathematical theory behind the wavelet transform.

The continuous wavelet transform of a function f(x) is defined as $$(T^{wav} f)(a, b) = \langle f, \psi^{a,b} \rangle$$

$$= \int f(x) |a|^{-1/2} \psi\left(\frac{x-b}{a}\right) dx$$

where $\psi(x)$ is the wavelet. To be considered a wavelet, the only technical requirement on the function $\psi(x)$ is that it have an average value of zero. From a more practical standpoint, there are many other requirements on the function to ensure that the resulting transform is useful. However, the requirements are quite variable depending on the application and the data $f(x)$ that it will be applied to. Suppose $$\psi(x) = \sum_k d_k \phi(2x - k)$$

$$\phi(x) = \sum_k c_k \phi(2x - k)$$

$\phi$ is called the scaling function. $d_k$ and $c_k$ are filters. Then the following identities, called the two-scale relations, hold:

$$\langle f, \psi_{m+1,n} \rangle = \frac{1}{\sqrt{2}} \sum_k d_k \langle f, \phi_{m,n+2^m k} \rangle$$

$$\langle f, \phi_{m+1,n} \rangle = \frac{1}{\sqrt{2}} \sum_k c_k \langle f, \phi_{m,n+2^m k} \rangle$$

$$\psi_{m,n} = \psi^{a,b} = |a|^{-1/2} \psi\left(\frac{x-b}{a}\right), a = 2^m, b = n$$

and similarly for $\phi$.

That is, if the scaling function coefficients are known at index m-1, then the wavelet and scaling function coefficients at index m can be determined. Therefore if the elements of a digital signal (i.e. a vector of numbers) are interpreted as scaling function coefficients at the initial level m=0, by applying the filters $c_k$ and $d_k$, the scaling function and wavelet coefficients at higher levels, m=1,2,..., may be determined thus generating the discrete wavelet transform.

This algorithm is known as the fast wavelet transform. Its computational complexity is O(N), which is slightly faster than the fast fourier transform. The filters $c_k$ and $d_k$ are called low- and high-pass filters, respectively. This refers to the part of the frequency spectrum that they are biased towards-low or high frequencies.

The simplest wavelet, the Haar wavelet, is generated from the top hat or characteristic function. The low-pass filter is c=[1, 1] and the high-pass filter is d=[−1,1].

While the above themes have been explained in detail for illustrative purposes, the present invention should in no way be limited to those precise schemes. Many other wavelets and corresponding subband coding schemes have been generated in recent years, and the use of these schemes in the method of the present invention is fully contemplated by the present invention.

Wavelet analysis is easily extended to functions of several variables, and has been used extensively in image processing. There are two types of compression commonly used, often simultaneously. Both are lossy—some information is lost in the compression procedure. In a truncation type scheme, wavelet coefficients less than a specified cutoff value are replaced by zeros. The vector of wavelet coefficients is then represented using a sparse data structure. This approach has been shown to be effective with certain types of signals.

In a quantization type scheme, the significant wavelet coefficients may be retained to a small precision (i.e. if the original signal is in double precision and the wavelet coefficients are stored in single precision). Denoising methods based on the wavelet transform have been extensively studied. The simplest approach is hard thresholding: replacing small wavelet coefficients by zeros. This gives the greatest compression and speed-up, but is not necessarily the most effective denoising method. More complex denoising approaches have been developed (such as the SURE algorithm of Donaho) and shown effective in many cases. Often the method is adapted to the type of signal and noise expected.

As discussed above, fast algorithms exist for computing the wavelet transform. The algorithm is based on the two-scale relation (1) and is of similar complexity, O(N), as the fast fourier transform, where N is the number of elements in the vector or signal. Unlike the FFT however, the complexity of the fast wavelet transform is also O(N) for sparse vectors with N entries (i.e. a signal with many zeros and N nonzero elements). Thus significant advantage in computational speed is gained by compressing via thresholding (replacing small entries with zeros).

Multi-dimensional Scaling (MDS) is a standard statistical method used on multi-variate data. In MDS, N objects are represented as d-dimensional vectors with all pairwise similarities or dissimilarities (distances) defined between the N objects. The goal is to find a new representation for the N objects as k-dimensional vectors, where k<d such that the interim proximates nearly match the original similarities or dissimilarities. The new coordinates are called the principal coordinates in k dimensions. This technique is often employed to produce a simpler representation in 2- or 3-space where relationships between the objects (based on the original dimensions) are now apparent. In the case where the original distance is Euclidean, then multi-dimensional scaling reduces to a principal component analysis where the original vectors are projected into k-space using the eigenvectors from the 2 largest eigenvalues. A principal component analysis is used to explain the variance-covariance structure through a few linear orthogonal combinations of the original variables. [Seber, G.A.F., Multivariate Observations, John Wiley & Sons, Inc. 1984, p. 235–241].

Several methods have been used to visualize theme breaks found in electronically formatted text. Salton's "tour" is a graph with links and nodes. [Salton, 1994] Heart has developed a system called "TileBars" which allows the user to define specific topics of interest and then produces a linear color block map to show where chunks of the document are likely to contain these topics. [Hearst, Marti A., "TileBar: Visualization of Term Distribution Information in Full Text Information Access", Proceedings of the ACM CHI Special Interest Group, May 1995, Denver, Colo.]

The present invention is thus a method for identifying the sub-topic structure of a document and visualizing those sub-topics. The invention is carried out as a series of instructions provided as a code for a programmable computer. The particular programming language selected is not important as long as the steps can be executed.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
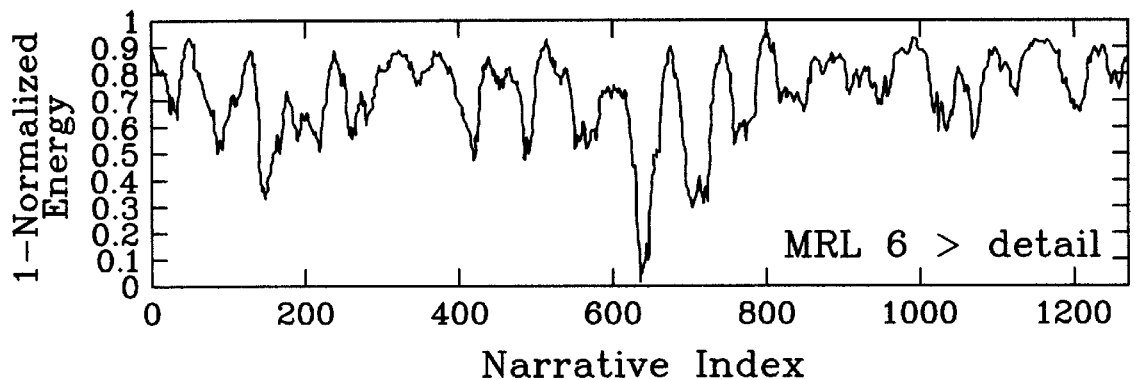
FIG. 1 is a series of plots of one minus the normalized composite wavelet energy at 3 fixed multi-resolution levels of an exemplary narrative.

The preferred embodiment of the present invention utilizes the following steps:

(1) Creation of a pseudo-corpus of words from an individual document using an overlapping window partition, (2) processing the pseudo- corpus to produce an association matrix that relates the words to each other, (3) creating a mathematical signal from the chronologically ordered, reduced vocabulary and the first several principal components from the association matrix or the full association matrix, (4) applying a discrete wavelet transform to this signal, and (5) generating a 3-D visualization.

Creating the Pseudo-corpus

To get the best terms possible for individual document analysis, a pseudo-corpus for an individual document is created prior to making a digital signal. The pseudo-corpus is created as the original document is partitioned into overlapping windows of a fixed word size and word overlap. For moderately long documents a window size of 120 words with a 60 words overlap is preferred. No words are omitted as the document is partitioned into windows. The ith window overlaps the (I-1)st window by a fixed number of words. The last window is usually incomplete and the first window may also be incomplete if the windowing starts at a location other than the first word of the document.

Processing the Pseudo-corpus

The resulting collection of document windows is then treated as a document corpus--thus the name pseudo-corpus. In a preferred embodiment of the present invention, the pseudo-corpus is fed into a text engine known in the art for further processing. The text engine produces a set of analysis products that are manipulated as taught in the present invention. The text engine will also reduce the amount of words contained within the document corpus by a variety of methods. For example, a text engine might remove stop words, stem words, filter the corpus according to word frequency or topicality, or perform some combination of these functions. In a preferred embodiment of the present invention, the "SID" text engine described in co-pending U.S. patent Ser. No. 08/713313, filed Sep. 13, 1996 entitled "System for information Discovery" and available from ThemeMedia Inc., Richland Wash. is utilized.

Stop words are very common words such as articles of speech, prepositions, and some adverbs. A standard set of stop words are removed by the text-engine from each of the pseudo-corpus windows as the first step in the preferred embodiment of the present invention. This step helps to reduce the dimensionally of the vocabulary needed to describe the original document and produce a more focused list of words.

Also in the text engine utilized in a preferred embodiment, a suffix and a prefix list may be used to help reduce each word to its stem. After stemming plurals become singular and verb forms are reduced to a common form. Stemming helps to reduce the dimensionality of the vocabulary needed to describe the original document and produce a more focused list of words. After stemming words may be referred to as terms; two initially different words may now be mapped into the same term.

Also utilized in the text engine utilized in a preferred embodiment is a document frequency filter. A document frequency filter specifies that a term must occur in at least A% of documents and in no more than B% of documents in order to be kept in the VSM vocabulary. Zipf's Law states that the majority of words will occur once or twice, a few words will occur very often, but the most useful words for document discrimination occur a moderate amount of times. [Zipf, G. K., Human Behavior and Principle of Least Effort: An Introduction to Human Ecology. Addison Wesley, Cambridge, Mass., 1949]. A document frequency filter is used to omit words that occur too frequently to usefully discriminate the topics between pseudo-corpus windows. Some infrequent words may also be eliminated. In the preferred embodiment, separate frequency filters are used for topic words and cross terms.

In the preferred embodiment, after the application of the stop word filter, the stemming filter and the document frequency filter, a topicality filter is applied. For each pseudo corpus window, a word frequency count expectation is calculated. This expectation is compared to actual word frequency count to arrive at words which appear to be non-random in their usage. The ratio of actual word frequency to expected word frequency is used to pinpoint words of "greatest topicality" and produces a topicality measure for each term. [Bookstein, A. et.al., 1995] "SID" actually uses the reciprocal of a ratio related to Bookstein's to assign topicality to terms. Thus for SID the greater the deviation from random usage the higher the topicality.

The terms which have survived the previous filters then go on to be classified as topics or cross-terms. In the preferred embodiment there is a different document frequency filter for topics and cross-terms. Those terms with the largest topicality measure are called topics. In the preferred embodiment, a topicality index of 1.0 (reciprocal of Bookstein's ratio of expected word occurrences to actual word occurrences) with document frequency filter values of A=1%, B=20% is used, however, other sets of values are also acceptable.

Those terms with lower topicality are called cross terms. In the preferred embodiment, a topicality index of 0.5 with document frequency filter values of A=0%, B=36% is used but again, other sets of values are also acceptable.

The topicality filter is in part a denoising algorithm as is the application of stop word list, stemming algorithms, and document frequency filters. However, denoising may be accomplished via the wavelet transform itself, so the application of these filters may not be necessary. The topicality filter also leads to a certain amount of compression, which again might be accomplished instead by wavelet transform combined with the Principal Component Analysis. Additional flexibility may also be gained by carrying out these procedures within the wavelet transform so that locally significant coefficients are retained. This effectively produces a "local" reduced vocabulary.

In the preferred embodiment, the resultant matrix contains rows associated with the N topics and columns associated with the (N+M) topics and cross-terms. This is called the Association Matrix. The entries contain the conditional probabilities modified by the independent probabilities. In particular, the (i,j)th entry is calculated as $A_{i,j}=P(term_j, term_I)-B*P(term_j)$. In the preferred embodiment B was taken as 2.0.

The conditional probability, $P(term_j, term_I)$, is the percentage of windows in the pseudo-corpus containing term I that also contain term j. $P(term_j)$ is the percentage of windows in the pseudo corpus in which term j occurs—which may be described as a window frequency count for term j.

The window frequency count is then incorporated as a penalty term. It is not necessary to include any information about how many times a word appears in a window, only whether it appears or not.

Creating the mathematical signal

In a preferred embodiment, a principal component analysis (PCA) is then performed on the (N) rows in the Association Matrix. In proof of principal experiments designed to demonstrate the efficacy of the present invention, the mean was not subtracted out; however this might be advantageous, especially since wavelet analysis is insensitive to the mean. Restricting this analysis to use only a subset of the N rows prior to the PCA should preserve the emphasis of certain channels of importance to a query.

In the preferred embodiment a mathematical signal is created from the narrative order of the words in the text. For example, suppose that there are K total words including duplicates left in the document after removal of stop words. Narrative index order is defined as the chronological order in which the words occur in the document—the word number. Thus the abscissa of the signal, in the preferred embodiment, is the narrative index in a view of the document without stop words which starts at one and goes to K. The terms that are either a topic or cross term (i.e. survived the various filters: stop word list, stemming, document frequency and topicality) are assigned their matching column of the Association Matrix. This vector may be described as a channel of "topic" sensors attached to each narrative term. In the preferred embodiment, only the first several principal components of the Association Matrix were utilized, and the columns were selected from this compressed matrix representation. Each channel is then identified with a PCA component rather than a specific term. In the preferred embodiment, terms not found in the topic or cross word list are assigned a vector of zeros of the appropriate length.

An alternative approach would be to simply delete the terms not in the reduced vocabulary and use the narrative index of the resulting compressed article as the abscissa.

The critical element in creating the signal is that each word is assigned a vector of values that contains the inter-relationships to all or an important subset of words in the document.

Each channel (either a PCA component or a topic word) is then transformed independently.

Application of the wavelet transform to the signal

Mathematically the definition of the Haar wavelet coefficients is $$w_{j,k,m} = \frac{1}{2^{k/2}}\left[\sum_{j'=1}^{2^{(k-1)}} y_{-j'+j,m} - \sum_{j'=1}^{2^{(k-1)}} y_{j'-1+j,m}\right]$$

where m is the channel, k is the multi-resolution level, and j corresponds approximately to the narrative index at which the filter is centered. The resulting "image" is a discretized version of the continuous wavelet transform, and thus is commonly referred to as the CWT, even though a more accurate description would be a redundant discrete wavelet transform. To remove redundancy a subset of j's which differ by multiples of 2^k would be computed. The main advantage of the redundancy, which is most commonly used in edge detection, is the accurate location of features with sharp edges. As practiced in the present invention, the edges of regions with similar thematic content are not necessarily so sharp, so the extra expense of the redundant representation may not be so important. Reducing this redundancy should enhance computational efficiency.

The composite wavelet energy is calculated by taking the sum of squares across all channels (index m) for a fixed location (index j) and fixed multiresolution level (index k). Mathematically the result (energy as a function of narrative index and multiresolution level) is identical for the PCA and non-PCA cases- this is a consequence of the orthogonality of PCA. In a preferred embodiment, the true value may also be approximated by taking the dominant PCA components. This approach dramatically enhances computational efficiency.

In the preferred embodiment, only those PCA components with singular values greater than about 1/100 times the maximum singular value are retained. This is sufficient to reproduce the total wavelet energy to sufficient accuracy for the objects of the invention- i.e. locating major thematic breaks. However, there may be information relevant for particular queries in the neglected channels. Thus, in certain implementations of the present invention, many more PCA channels might be kept to provide additional information as may be required by the particular user. In the preferred embodiment a Haar filter is used. As will be apparent to those skilled in the art, other filters could also be used; the optimal filter being dependant on the particular user needs.

In the preferred embodiment of the present invention, a dilation factor of 2 is used. This is the most commonly used dilation factor in wavelet analysis, however, other dilation factors might be used, and more redundant systems may also be useful. For example a dilation factor of the square root of two would provide information from averaging over window sizes intermediate between those computed in the preferred embodiment. This would produce an image of the CWT which is smoother than that obtained in the preferred embodiment. For certain users, there may be an advantage to using this approach over an interpolation procedure implemented in the preferred embodiment.

Generating the visualization

A 2-D signal may also be created by choosing narrative index to be one variable and date of publication to be a second variable. Wavelet analysis is readily applicable to such multi-D signals.

The potential also exists for performing compression and denoising within the wavelet transform utilizing known methods. For example, a compression algorithm such as hard thresholding would be an example of a straightforward approach. Alternatively, a particular type of soft thresholding may be best suited for certain signals.

As an alternative to the preferred embodiment, the fast wavelet transform algorithm is important to improve the efficiency of the procedure, especially for large documents where long filters need to be applied. The complexity of the fast wavelet transform is O(N log M) as opposed to O(N*M) for the method implemented in the preferred embodiment, where N is the number of words in the reduced article and M is the size of the largest window. Other hierarchical systems may also contain similar information.

Queries in the preferred embodiment

It is in the implementation of queries that the importance of the association matrix becomes clear. If zero-order statistics such as word frequency are used, as in the approach of Hearst, there will be no recognition of the synonymous use of different words. In either approach described below the query words may not actually appear in the article; however, similarity in usage pattern may still be noticeable.

One way of conducting a query is to select a particular topic word or set of words and magnify the wavelet energy contained in the channels associated with those words. If the query words are topic terms for the article then there is little change required in the computational algorithm. If a query word is not a topic term for the article, then it is necessary to expand the association matrix by appending the query word list onto the list of topic terms. To illustrate this approach, consider the N topics sensors attached to each word in the current reduced vocabulary as a set, W. The sensors attached to the query are members of another subset Q—a fixed set. Let w be a number 0<w<1. If A is the sum over all channel energy for the set of N averaged sensors and B is the sum over all channel energy for the set of Q averaged sensors, then the new query energy is (1−w)A+wB. The w term is a sensitivity weight. The larger w the more amplification any mention of the topics in the query will generate as the signal is processed.

For a more flexible and broad-spectrum query procedure, this approach could easily be modified to extract information about distance from a specified usage pattern which has been determined to be relevant to the query. The reference pattern may then be extracted from the given article or from a completely different context, e.g. one or more similar articles. More specifically, instead of taking a difference between two adjacent windows, the second vector in the difference is the sensor values averaged over the query terms. In this case the present invention is looking for common regions of thematic content for the query and the moving window. An extended cosine formula is preferred in this circumstance.

The extended cosine procedure is nearly identical to the composite wavelet energy except that the normalized dot product is used to operate on the vectors to be compared, thus emphasizing the pattern of usage and de-emphasizing some information about frequency of usage. In the extended cosine output signal, low values correspond to dissimilar usage patterns and high values to similar usage patterns.

As used herein, the visualization of sub-topic structure includes an energy surface device called "Waves" and a topographical surface called "Topic Islands". Also as described herein, this approach to sub-topic structure is called "topic-o-graphy".

Figure 1B:
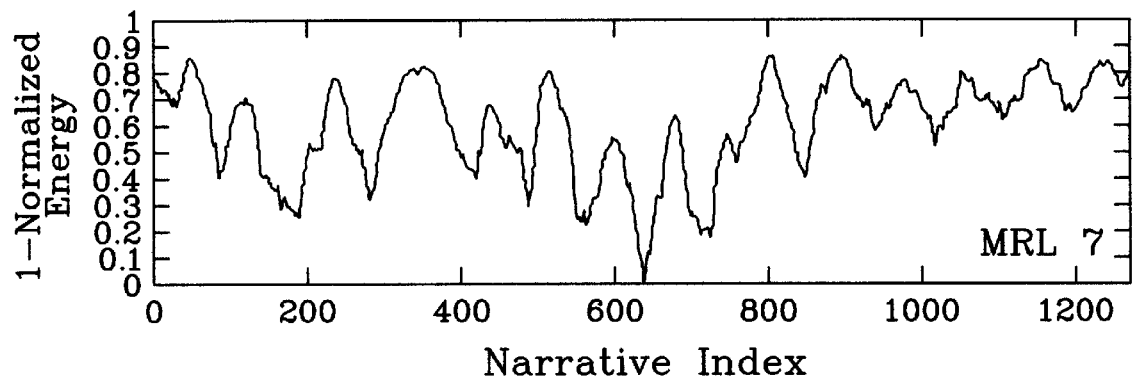
Figure 1C:
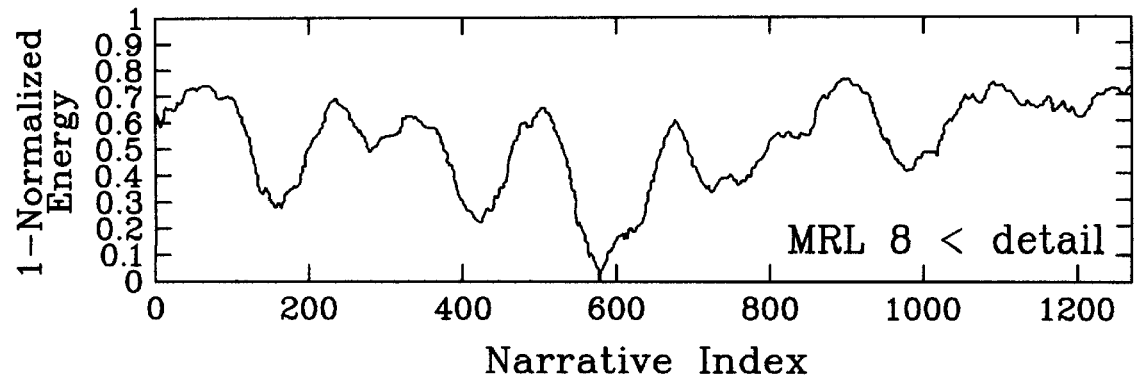
Figure 2:
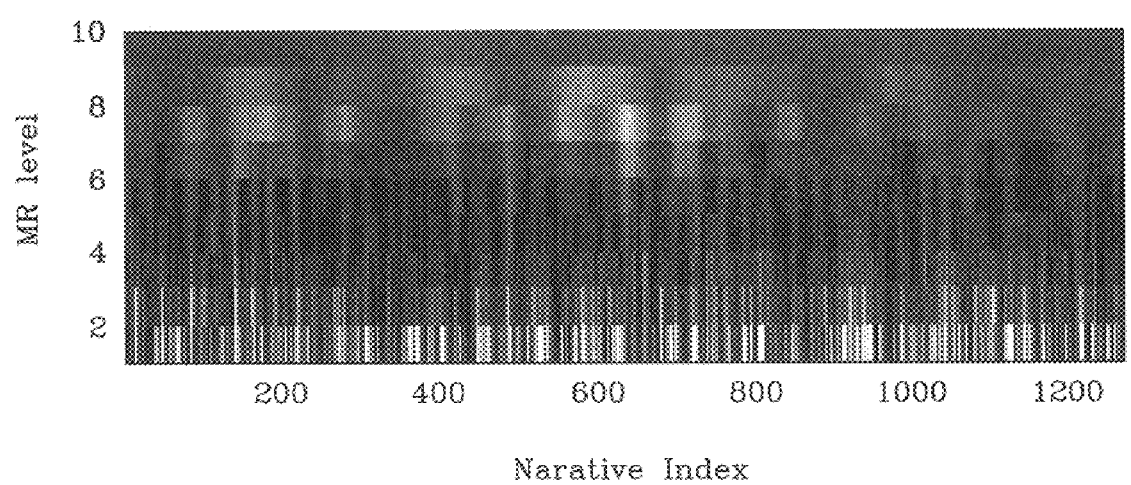
FIG. 2 is a grey scale plot combining nine plots as created in FIG. 1.
Figure 3:
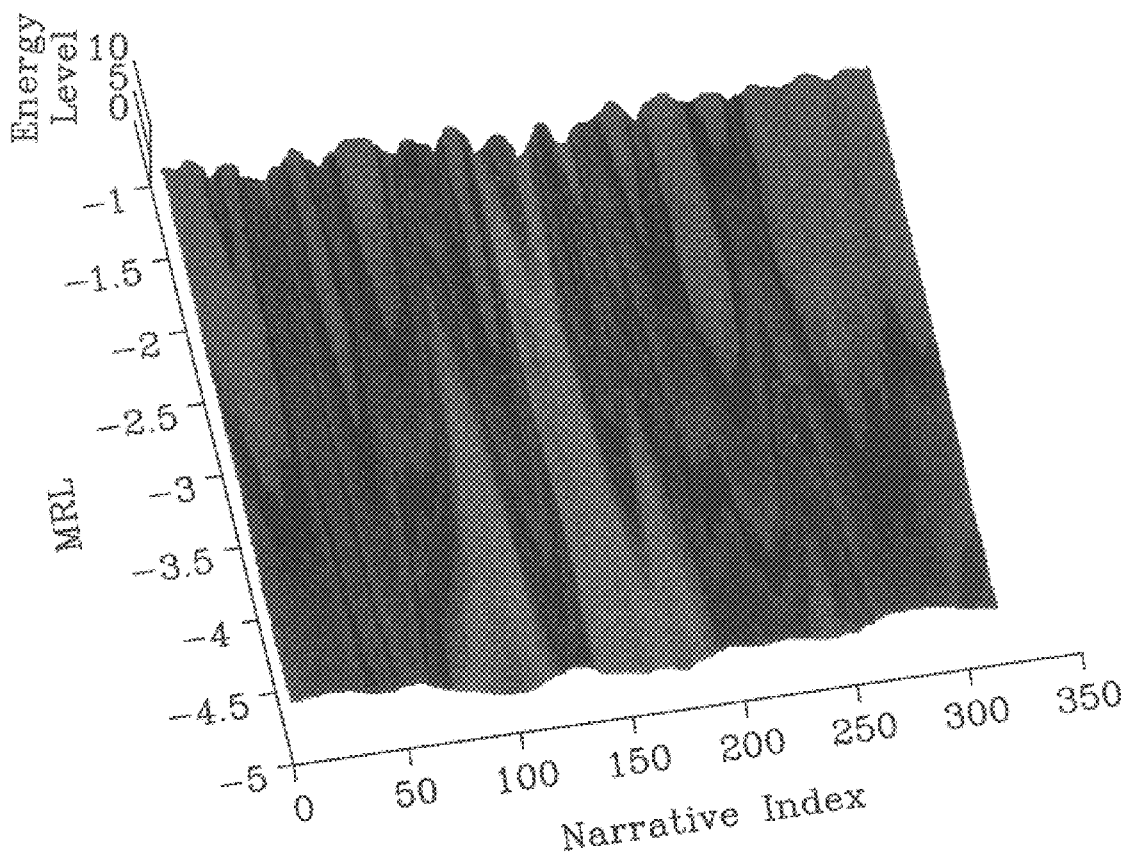
FIG. 3 is a 3-D rendering of the smoothed plot of FIG. 2 where the z-axis is formed using energy intensity.
Figure 4A:
FIG. 4 depicts a graph of the energy levels from three different multi-resolution levels. Each of these graphs further depicts the division of the signal into thematic chunks by selecting a particular energy level which then partitions the document.
Figure 4A:
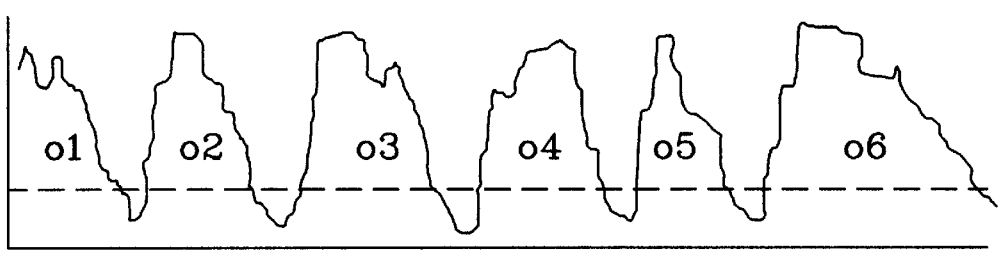
Figure 4B:
Figure 4B:
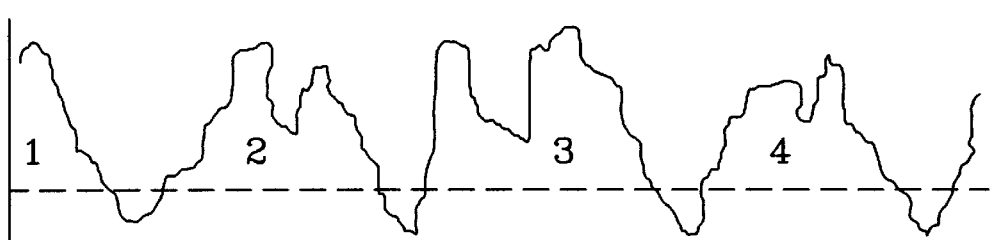
Figure 4C:
Figure 4C:
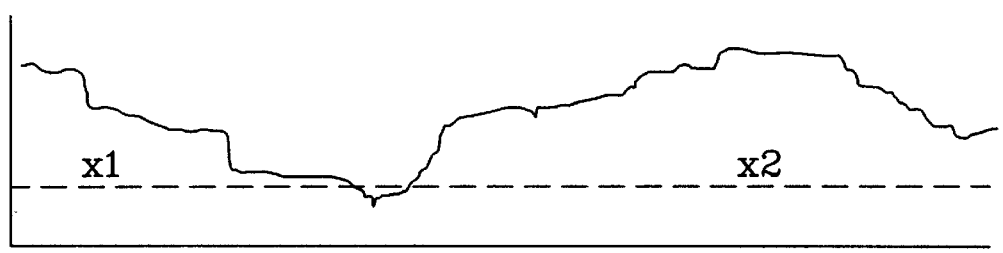

In the preferred embodiment of the present invention, a 2-D image is formed by first taking the x-axis as the narrative order of terms, then taking the y axis as the Mdiscrete multi-resolution levels as illustrated for three multi-resolution levels in FIG. 1. These separate multi-resolution levels are then combined as illustrated in FIG. 2. using a color shade or gray-scale to indicate the energy level. As illustrated in FIG. 3, this visualization may then be extended to a 3-D colored or grey scale surface plot. The z-axis is then used as the energy level together with color shading or grey scale also corresponding to energy level. As shown in FIG. 3, the x-axis is the narrative word order, the y-axis is the multi-resolution level on a log scale, and the z-axis is the energy level. Additionally, the resultant surface may be smoothed. Visualization may be dramatically enhanced by then allowing the user to rotate the orientation angle. This dynamic surface shows at a glance the entire thematic complexity of the article at all the multi-resolution levels including major sections of topics, subsections, and transition paragraphs. This surface is described herein as "Waves" because as it is animated through various orientation angles it has the appearance of waves and because of the connection to wavelets. These visual "Waves" thus provide the user with the information present in a written outline. Further, the surface representation is more flexible than a standard outline or tree because instead of requiring each sub-section to be strictly contained in one and only one higher level section, subsections may be "fuzzily" contained in a section or more than one section. For example, a discussion of a given topic may be primarily located in one part of a document with a minor discussion located in a different part of the document. The primary location may be found using a coarser multi-resolution level (a higher value for k) while the minor discussion would be located using a finer multi-resolution level(a lower value for k). Thus, "fuzzily" located refers to the phenomenon where discussions of a single topic are scattered throughout a document. This flexibility could also be useful in extending other tree-like structures such as categorization of subjects for encyclopedias or libraries to more accurately represent interdisciplinary topics.

An elevation or (x-y) location can be specified from graphical user input to perform certain functions. For example, the user can specify the elevation, or energy level, used in selection of text breaks by GUI on the "Waves" visualization. The user can select multi-resolution levels of interest for "Topic Island" generation. The user can also select a text location of interest for "Topic Island" generation or retrieval. Any location on the "Wave" visualization will have a specific multi-resolution level and energy level. By selecting a given point, and thereby specifying a multi-resolution level and energy level, the user then defines a cut off value of energy which may be used to partition the document. Three separate partitions are illustrated at three separate multi-resolution levels in FIG. 4.

In the preferred embodiment, the 3-D representation is created by first selecting several energy level and multi-resolution level pairs for various locations on the "Wave." This in turn will define a collection of thematic chunks at each multi-resolution level as described above. The 3-D view is achieved by calculating 4 values for each thematic chunk. Two of these values are calculated using an MDS projection on the centoids for the collection of thematic chunks. These values are used to determine the placement of the thematic chunk in the x-y plane. The multi-resolution level is then used to determine the placement of the thematic chunk in the z plane. Finally, the radius of each thematic chunk is calculated using some measure of overall variability for each thematic chunk.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for automatically determining a semantic structure of an electronically formatted natural language based document consisting essentially of words, the method comprising the steps of:

a) providing a numerical representation as a digital signal of the words within the document wherein said numerical representation contains some information relating the semantic content of the word to the semantic content of the document b) performing a wavelet transform on said signal, thereby determining the semantic structure.

2. The method of claim 1 wherein said wavelet transform is selected from the group comprising a fast wavelet transform, a redundant wavelet transform, a non-orthogonal wavelet transform, a local cosine transform, and a local sine transform.

3. The method of claim 1 further comprising the step of utilizing the output of the wavelet transform to generate a visual representation of the semantic structure of the document.

4. The method of claim 3 wherein the visual representation of the semantic structure of the document is selected from the group comprising a text based representation and a graphical representation and combinations thereof.

5. The method of claim 1 wherein the method of providing said numerical representation of the words within the document is selected from the group consisting of words frequency counts within the entire document, words frequency counts within subsets of the words in said document, functions of word frequency counts within the entire document, functions of word frequency counts within subsets of the words in said document, statistical correlations between words in said document, statistical correlations between groups of words contained in said document, and combinations thereof.

6. The method of claim 1 further comprising the step of utilizing the output of the wavelet transform to partition the document.

7. The method of claim 6 wherein the document is partitioned according to the semantic structure of the document at a single level.

8. The method of claim 6 wherein the document is partitioned according to the semantic structure of the document at multiple levels to produce an outline of the document.

9. The method of claim 6 wherein the document is partitioned according to the semantic structure of the document at multiple levels to produce a fuzzy outline of the document.

* * * * *